United States Patent [19]
Sterlini

[11] 3,811,663
[45] May 21, 1974

[54] INTIMATE GAS-LIQUID CONTACT METHOD AND APPARATUS

[75] Inventor: Jacques Sterlini, Paris, France

[73] Assignee: Societe Anonyme: Compagnie Electro-Mecanique, Paris, France

[22] Filed: Jan. 26, 1971

[21] Appl. No.: 109,767

[30] Foreign Application Priority Data
Jan. 27, 1970 France .............................. 70.02814

[52] U.S. Cl............. 261/151, 261/21, 261/DIG. 54, 261/29, 261/36 R, 261/79 A, 55/237, 55/257
[51] Int. Cl............................................. B01f 3/04
[58] Field of Search ............ 55/235, 237, 238, 257; 261/3, 151, 21, 29, 36 R, 79 A, DIG. 54, DIG. 75

[56] References Cited
UNITED STATES PATENTS
3,514,924   6/1970   Flebu............................... 261/79 A Primary Examiner—Frank W. Lutter
Assistant Examiner—Steven H. Markowitz
Attorney, Agent, or Firm—Littlepage, Quaintance, Murphy & Dobyns

[57] ABSTRACT

A process permitting the intimate contact of a gaseous medium and a liquid medium obtaining a considerable economy of investments with respect to the prior technique. The process generally consists in forming a very fine emulsion of the gas in the liquid, by submitting the latter to high velocity movement, the initial necessary accumulation of kinetic energy of said liquid on the one hand, and the continuous compensation of losses by friction of said liquid on the other hand being obtained by means of a thermodynamic cycle described by the gas itself. The invention is applicable to all processes for transfers of mass and energy as well as chemical reactions wherein gases and liquids are contacted.

13 Claims, 3 Drawing Figures

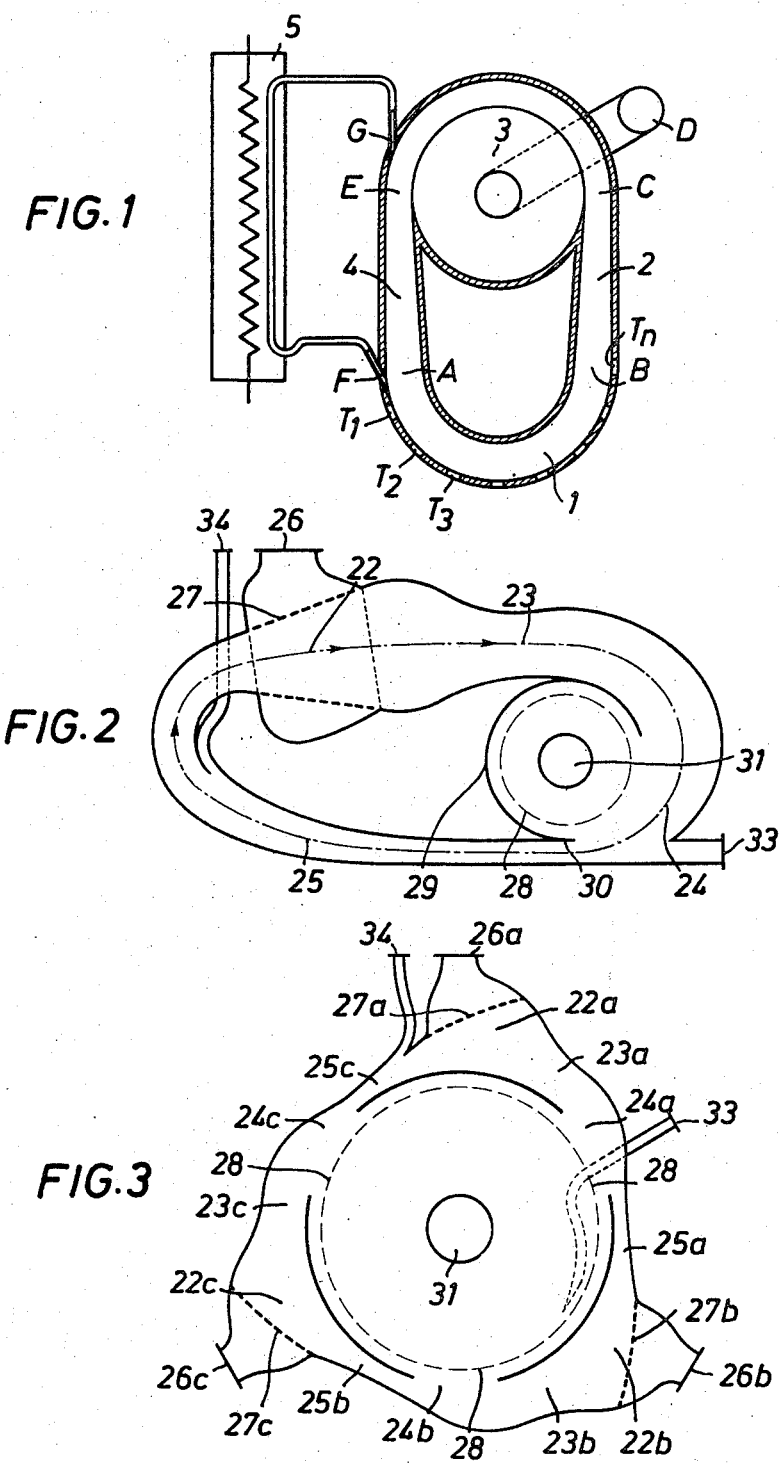

INTIMATE GAS-LIQUID CONTACT METHOD AND APPARATUS

The invention relates to the field of mass and energy transfers as well as that of chemical reactions between at least one gas and a liquid, by intimate contact of gaseous and liquid components.

In all cases where a physical process and/or a chemical reaction are to be carried out by the intimate contact of a liquid phase and a gas phase, the problem arises of obtaining economically very large contact surfaces between the two phases. The case can arise when a gas or at least one of the components of a gaseous mixture, is to be dissolved in a liquid solvent; or when a gas or one of the components of a gaseous mixture is to be reacted chemically on a liquid body or on at least one of the components of a liquid mixture or vice versa.

Another case frequently met with in practice is that of mutual heat transfer between a gas and a liquid by a contact permitting heat exchanges to be carried out.

One of the known solutions consists in causing the liquid to flow within a tower over gas permeable filling bodies and forming a stack of pieces of suitable shape such as rings, short cylinders cut out of tubes, for instance, the gases circulating in the tower in counter flow to the liquid.

The drawback of such systems is that they are both voluminous and costly (especially if the process has to be carried out under pressure). At the most, the size of the solid contact surfaces which can be obtained in this manner is about 500 $m^2/m^3$. Furthermore, a large amount of energy is required for pumping the liquid to the top portion of the tower; and to this must be added the expenditure of energy necessary for gas circulation.

The object of the present invention is a process permitting the intimate contact of a gaseous medium and a liquid medium obtaining a considerable economy of investments with respect to the prior technique.

Another object of the invention is a process providing very large contact surfaces between the gaseous medium and the liquid medium.

Another object of the invention is a process enabling to carry out operations by contacting large amounts of gas with a liquid medium, with a high volume yield.

Still another object of the invention is a process enabling to obtain in a very short time the result of the contact between the gas and the liquid.

Generally speaking, the process proposed by the invention consists in forming a very fine emulsion of the gas in the liquid, by submitting the latter to high velocity movement, the initial necessary accumulation of kinetic energy of said liquid on the one hand, and the continuous compensation of losses by friction of said liquid on the other hand being obtained by means of a thermodynamic cycle described by the gas itself.

It is thus possible to obtain both very large contact surfaces at very low cost, as they are those of the gas bubbles formed in the liquid, and a large specific flow of gas owing to the high speed of emulsion.

More precisely, the object of the invention is a process for intimately contacting a gas and a liquid comprising the following steps a. the liquid is compressed at a pressure $p_1$ and brought to a velocity greater than about 1 m/sec, whereas the gas is compressed at a pressure $p_0$ slightly higher than the said pressure $p_1$, b. an emulsion of the gas at the said pressure $p_0$ is formed in the liquid raised to the said pressure $p_1$ and circulating at the said velocity, thus obtaining small bubbles of gas evenly distributed in the said circulating liquid, c. the emulsion formed in step b. is expanded to a pressure $p_2$, lower than $p_1$, by passing it through an expansion zone comprising a nozzle, which also has the effect of accelerating the liquid emulsion, providing a very intimate contact between gas and liquid, and d. separation of the gas from the accelerated emulsion from step c.

The process of the invention can also comprise an additional step e. wherein the liquid obtained after the separation step d., and being at high speed, is flowed into a recompression zone consisting of a diverging hydrodynamical pipe, which permits a liquid to be collected at a slower velocity, and at a pressure $p_3$, this last pressure being at least equal to pressure $p_1$.

All these operations form the steps of a thermodynamic cycle during which the gas yields energy to the liquid, owing to its expansion, thus compensating the inner frictions and enabling a high velocity of circulation of the gas and liquid currents to be treated to be obtained.

In step a. the velocity of the liquid can be raised to a value in the range of 2 to 30 m/sec, and notably in the range of 5 to 25.

In trials carried out according to the invention, it was possible to obtain gas-liquid contact surfaces in the order of several tens of thousands of $m^2$ per $m^3$, with circulation velocities of the emulsion formed in the range of 10 to 60 m/sec.

Another object of the invention is a device for carrying out the process described hereinabove, the said device comprising a closed liquid circuit where there are provided in series, successively in the direction of liquid flow:

1. means for the injection of gas into the liquid situated in the high pressure zone $p_1$
2. an expansion nozzle for the gas-liquid emulsion formed in (1) and
3. means for separating the gaz from the emulsion after expansion in the said nozzle, as well as additionally
4. a diffusor receiving the liquid after separation from the gas.

As can be seen, the invention lends itself in a particularly advantageous manner to continuous operation. The gaseous and liquid streams are contacted continuously in a closed loop from which the partial gas and liquid streams can be extracted after intimate contact. Thus, the device described hereinabove in addition generally comprises means for the introduction of fresh liquid and means for extracting a partial current of treated liquid.

This liquid flow which will be referred to as the "external flow" can be used not only to maintain the composition or the contents of the liquid circulating in the loop within suitable limits, but also to maintain the temperature of the said loop at a value suited to requirements.

In one application of the invention, heat exchanges occur between the gas circulating in open circuit and the liquid circulating in closed circuit, by direct contact between the liquid and the gas divided into fine bubbles, the gas being injected for this into a closed liquid circuit zone (emulsifying zone) and extracted in another zone of this liquid circuit situated further downstream.

It is obvious that whatever the composition of the gas at the inlet, it will have at the outlet a steam content of the liquid component imposed by the vapour tension of said liquid component, the closed liquid circuit comprising a derivation permitting the calories (or frigories) yielded by the gas to be transmitted to the exterior. Also, the energy necessary to ensure the circulation of the liquid circuit is taken from the gas by means of the following successive steps:

Emulsifying the gas and liquid in the portion of the liquid circuit where the pressure is highest.

Expansion of the composite fluid so formed during which the liquid acquires, without taking losses into account, the energy brought into action by the gas.

Separation of the gas having exchanged its heat with the liquid.

Recompression of the liquid on its own energy to the emulsification pressure.

A device suited for the embodiment of such a process comprising a closed liquid circuit in which there is found in series, in the direction of liquid flow, successively:

means for gas injection (emulsifier) into the liquid situated in the high pressure zone of the liquid circuit;

a channel where the composite fluid thus obtained is expanded, the gas exchanging its heat with the liquid at the same time as it exerts thereon the work brought into action during its expansion;

a separator where the gas is extracted expanded, having yielded its calories (or its frigories) to the liquid;

a diffusor wherein the liquid having undergone the gas expansion operation is recompressed to the high pressure of the liquid circuit exisiting at the level of the emulsifier;

a derivation circuit wherein there circulates in a closed circuit an external flow of liquid comprising an outer heat exchanger which removes the calories (or the frigories) obtained from the gas.

This device has the advantage of permitting very large volume of exchanges and very rapid cooling (or reheating); moreover the gas only carries out a small amount of work as it is only used to compensate the losses of charge of the liquid circuit.

It is important to note that the process of the invention is characterized by the steps defined hereinabove and carried out in succession. The combination of steps a, b, c, d as well as additionally e, will be referred to as a "sequence" in the present description. A "sequence" is characteristic of the invention.

It is obvious that the invention also covers the modes of embodiment consisting in multiplying and combining unitary systems so defined.

As an illustration, a sequence of the type defined hereinabove can be reproduced several times, the various successive sequences being applied to the same liquid stream circulating in closed circuit.

In this case the complete loop comprises $n$ gas inlets in parallel on the total flow of gas treated by the said loop, these $n$ inlets corresponding to $n$ separated emulsifiers. It can comprise $n$ gas outlets, also in parallel, corresponding to $n$ distinct separators, or again, said $n$ separators can be grouped into a single one.

According to the invention, the device is further conpleted, here again, by at least one inlet of an "external flow" of fresh liquid to a suitable place in one, or the separator for instance, and at least one outlet for treated liquid at the outlet of a diffusor for example. These last special arrangements have the advantage of ensuring by themselves, as has been said, the pumping of said external liquid flow as it thus flows out at a higher pressure than that at which it entered.

However, if it is found advantageous, and notably if the fresh liquid is already available under pressure, the inlet and outlet of this external flow can be reversed, or their places on the loop changed, without departing from the scope of the invention.

Finally, generally speaking, it is possible according to the invention to place in series at one and the same time on their external liquid flows, a certain number of devices such as those described hereinabove, either single, looped with one sequence, or complex (with $n$ sequences). In particular, the order in which the gas flows through such various devices one after the other could be the contrary to that in which the external liquid flows through them, so as to obtain a methodical circulation, that is to say a more perfect pumping out of both flows having regard to the effect to be obtained.

The various modes of embodiments will be illustrated in detail hereinafter.

In as far as concerns the material embodiment of the device, and more particularly of the emulsifier, it has been found that an excellent emulsion can be obtained simply by causing the gas to enter the liquid, notably through apertures suitably placed in a divergent portion of the side walls of the conduit in which the liquid circulates. The ever smaller division of the bubbles then occurs by itself, and very rapidly, provided that the velocity of the liquid is sufficient, greater than 2 m/sec for instance, and that a negative pressure gradient exists in the flow (acceleration).

As to the expansion nozzle, the cross section thereof should have at each place a value depending on the velocity reached and the local flow in weight: as experience shows that the evolution of the gas is practically isothermal, this circumstance permits the cross-section of the passage at all points to be calculated. In practice it has often been found that the shape obtained then has a sonic throat (similarly to a Laval nozzle for steam).

Finally, the separator can simply consist of a change in direction of the conduit (bend): in such a bend transversal pressure gradients appear, and the bubbles migrate by themselves to the inner portion of said bend where the lowest pressure exists; there follows the establishment of a liquid free surface where the gas is separated from the liquid and is subsequently removed from the apparatus.

Finally, the diffusor is a known member wherein the cross-section increases and the velocity decreases, which causes the increase in pressure.

A difficulty consists in adjusting the inlet section of said diffusor whereby almost the whole of the liquid flow is admitted therein, but without a large gas flow penetrating therein; experience shows that such an adjustment is very possible. One of the solutions consists in providing in the inlet of the diffusor a so called lip for repacturing the liquid stream, thereby dividing it in two parts: the main part of the stream enters the diffusor and the other part forms a liquid ring which is in vortex motion within the space of the separator. Then the internal part of this ring forms the free surface on which the bubbles leave the emulsion.

The invention is applicable to any physical process and/or chemical reaction occurring between a gas and a liquid. The expression "physical process" designating any transfer of mass and/or energy. The gas and the liquid can either be a simple body or a complex mixture, and the said action of one phase on another can concern either only one of the original components or each of the phases or several components initially belonging to one or two of the phases.

It is also applicable in the case where the liquid carries in suspension a solid, or another non-miscible liquid in the form of particles able to participate in the chemical reaction or to act as catalyst in the said reaction.

It is also applicable in the case where the gas contains a solid or a liquid in suspension or in dispersion for the transfer of this suspension or dispersion from one phase to the other.

Another advantage of the invention is that the results of the contact between gas and liquid may be obtained in a very short time. Thus there may be especially carried out drops in temperature of a component of the system from high temperatures, for example 1,000°C, down to room temperature during very short periods of time, ranging about 1/100 sec.

As examples of applications of the invention which are in no way limitative may be mentioned examples relating to the washing or extraction of a gas by a liquid medium, one of the components at least of which is capable of reacting with the impurities to be removed from the gas. The following cases may also be mentioned:

scrubbing of argon by bubbling in a stream of liquid sodium extraction of carbon monoxide CO from a gaseous mixture by an aqueous solution containing cuprous ions extraction of carbon dioxide gas $CO_2$ from a gaseous mixture by an aqueous solution containing arsenious ions.

As an example of the extraction of a component of a gaseous mixture by dissolution in a liquid, there may be mentioned the case of the extraction of $CO_2$ from a gas mixture by dissolution in methanol. The invention is applicable to all the cases of selective extraction by liquid solvent of certain components of a gaseous mixture.

According to the invention, it is also possible to treat gases containing solid particles, such as dust, by passing them through a purifying liquid which retains the dust.

The invention is of particular importance in the fight against atmospheric pollution. It will be understood that the invention has very broad applications as it relates to all physical and/or chemical treatments wherein a gaseous medium and a liquid medium have to be intimately contacted.

The invention will now be illustrated with reference to the appended drawings in which:

FIG. 1 is a diagram in cross-section of a device which can be used as a heat exchanger between a liquid and a gas.

FIG. 2 is a diagram of a device according to the invention for carrying out a single sequence process.

FIG. 3 is a diagram of a device according to the invention for carrying out a process with several sequences.

FIG. 1 shows a loop shaped device with an injection zone 1 (emulsifier), where the liquid enters at A and receives the gas by apertures $T_1$, $T_2$, $T_3$, etc . . . $T_n$. At B the composite fluid leaves the emulsifier and then flows into nozzle 2 where it expands, the gas-liquid exchanges occurring in this nozzle. At C, the emulsion leaves the nozzle at an accelerated velocity and penetrates separator 3; said separator consisting of a bend on a half turn where the fluid flows with a free surface by which the bubbles migrate. The gas extracted from the liquid then leaves the device at D, while the gas-free liquid leaves the separator at E and enters the diffusor 4 where it is recompressed to the pressure existing at A. A small external flow of liquid is removed at F, then reinjected into the liquid circuit at G where the pressure is lower, after having yielded in exchanger 5 an amount of heat equal to that absorbed by the liquid in the system.

A form of embodiment of an improved device for the intimate contact of a gas and a liquid is shown in FIG. 2.

This device uses a sequence such as has been previously described, by means of which a thermodynamic cycle can be obtained. Here it is a question of a simple loop having only one sequence. The various elements of the sequence are positioned in the areas on the median line shown by dotted lines.

This device makes use of the fact that the energy contained in the liquid after separation is such that the possibility exists of obtaining at the outlet of the diffusor a pressure $p_3$ at least equal to $p_1$ and even higher.

It is understood that an external flow of fresh liquid must be provided, and the treated liquid must be purged so that the composition of the liquid thus circulating in closed circuit is maintained at suitable levels. Furthermore, the device is itself capable of pumping this external flow as it is possible to cause it to enter at a pressure $p_1$ and leave at a pressure $p_3$ at least equal to $p_1$.

The essential members of the device shown in FIG. 2 are of the same type as those already described with respect to FIG. 1.

The emulsifier occupies zone 22. The gas inlet is represented by tubular 26 and the gas is injected into the liquid through apertures 27 formed in the walls of the device, as is shown. The emulsifier is designed in such a manner as to provide an increasing cross-section to the emulsion as it forms, so as to maintain as uniform a pressure as possible in this zone.

This expansion nozzle spreads throughout zone 23. It provides the emulsion with cross sectional passages calculated so that the velocity increases in a regular manner along the entire length of the said zone.

There is shown here, as an example, the case in which this nozzle comprises a throat. The velocity of sound in the emulsions is, in fact, very slow. For example, for a mixture of water and air at 50 percent by volume, at atmospheric pressure, this velocity is only about 20 m/sec. It will therefore often occur in cases where the nozzle must have a throat, especially when the mean pressure in the system will be moderate.

The separator occupies zone 24. This zone is in free relationship along a portion of the path of travel with a Vortex organized within the curve by means of a wall 29 connected to an inlet lip 30, in the form of a liquid ring in rotation. A cylindrical free surface 28 of the liquid phase is thus obtained in the said Vortex.

This free surface 28, shown by dotted lines, is continually traversed by the gas bubbles still subjected to Archimedes' buoyancy. The gas thus separated out escapes through conduit 31 (perpendicular to the plane of the figure). The liquid is slowed down and recompressed in diffusor 25 before penetrating zone 22.

The device is completed, as has been said, by an inlet 33 for an external flow of fresh liquid, and by an outlet 34 for an external flow of liquid having been subjected to the desired evolution. The respective positions of this inlet and this outlet can be reversed without departing from the scope of the invention. In this latter case, additional energy is supplied by the forced introduction at 34, or forced aspiration at 33, of said external flow.

A device of the type shown in FIG. 2 permits large masses of liquid and gas to be placed in intimate contact and the time of contact can be adjusted as a function of the external flow selected.

FIG. 3 shows one form of embodiment wherein several sequences have been disposed along a same loop. The number here is 3, but it could be smaller or larger without departing from the scope of the invention.

The same elements as are shown in FIG. 2 are easily recognizable, bearing the same reference numbers, but comprising indications a, b, c, characterizing the three sequences under consideration.

In this figure, as an example, the case is shown where the three separators 24a, 24b, 24c are in relation with a single general Vortex formed of a single liquid ring comprising a single cylindrical surface 28 shown by dotted lines, and having for axis perpendicular to the plane of the figure the repetitive axis of the three sequences.

It is obvious that this Vortex could be replaced by three separate Vortexes disposed about the repetitive axis, and beside respective separation zones 24a, 24b, 24c, without departing from the scope of the invention.

Finally, in this FIG. 3, there is shown a single inlet 33 for the external flow of fresh liquid, and a single outlet 34 (purge) for the liquid which has been contacted with the gas, but it goes without saying that their number could be equal to that of the sequences without departing from the scope of the invention. Similarly, their position along the loop is not imperative: the only rule to be observed is that the outlet should not be directly adjacent to the inlet, so that the fresh liquid has the possibility of being properly mixed in the main flow of the loop.

Here also the external flow or flows are arranged to be used to regulate the temperature of the loop.

A device such as FIG. 3 has the advantage of permitting a greater flow of gas in a same general volume, and also that of permitting each zone of each sequence to be provided more easily with the relative space it requires.

Many variants and modifications can be brought to the present invention within the scope defined by the appended claims.

I claim:

1. A process for the intimate contacting of a gas and a circulating liquid comprising at least one sequence, each sequence comprising the following steps:

A. providing a circulating liquid at an initial velocity and at a pressure $P_1$, and a gas at a pressure $P_0$, slightly higher than said pressure $P_1$,
    B. injecting said gas at the pressure $P_0$ upstream from an expansion zone into the circulating liquid in the form of finely divided bubbles of gas thereby forming a fluid mixture comprising a gas phase in the liquid phase,
    C. flowing the mixture through the expansion zone and expanding it to a pressure $P_2$ lower than $P_1$ while effecting an acceleration of the mixture,
    D. separating the gas from the liquid by subjecting the mixture to a change in direction such that a transverse pressure gradient causes the gas bubbles to migrate to a region of lowest pressure, and
    E. flowing the liquid obtained after the separation of the gas into a recompression zone which permits the liquid to be brought to a circulation velocity and a pressure substantially equal to the velocity and pressure of the liquid in step A.

2. The process of claim 1 wherein in step C the mixture is brought to a velocity greater than the velocity of sound therein.

3. The process of claim 1 wherein the liquid is augmented by an additional current of fresh liquid and depleted by a partial current of liquid which has already intimately contacted the gas.

4. The process of claim 3 wherein said partial current of liquid which has already intimately contacted the gas is thermally modified and reintroduced into a sequence as said fresh liquid.

5. The process of claim 1 wherein in step A the initial velocity of the liquid is in the range of 2 to 30 m/sec.

6. The process of claim 1 wherein in step A the initial velocity of the liquid is in the range of 5 to 25 m/sec.

7. The process of claim 1 wherein in step B the velocity of the mixture formed is in the range of 10 to 60 m/sec.

8. A gas-liquid contacting apparatus comprising a closed circuit containing a flowing liquid wherein there is provided at least one series of means for intimately contacting a gas and the circulating liquid, each series, in the direction of liquid flow, successively comprising:

A. means for injecting the gas into the flowing liquid in the form of finely divided bubbles, thereby forming a fluid mixture,
    B. means for expanding the fluid mixture,
    C. means for separating the gas from the fluid mixture after expansion, and
    D. diffuser means for recompressing the liquid and directing the same after separation from the gas to a subsequent similar series.

9. The apparatus of claim 8 further comprising means for augmenting the flowing liquid by introducing fresh liquid and means for depleting the flowing liquid by extracting a partial current of liquid which has already intimately contacted the gas.

10. The apparatus of claim 9 further comprising a heat exchanger connected between the depleting means and the augmenting means whereby said partial current of liquid is received from the depleting means, thermally modified, and directed to the augmenting means.

11. The apparatus of claim 8 wherein the gas injecting means comprises apertures formed in a divergent portion of the side walls of the closed circuit in which the liquid circulates.

12. The apparatus of claim 8 wherein the fluid expanding means comprises an expansion nozzle having a sonic neck.

13. The apparatus of claim 8 wherein the gas separating means is in the form of a vortex.

* * * * *